United States Patent
Wenzel

[11] Patent Number: 5,385,449
[45] Date of Patent: Jan. 31, 1995

[54] COMPRESSOR ARRANGEMENT

[75] Inventor: Harald Wenzel, Kefenrod, Germany

[73] Assignee: Mannesmann Aktiengesellschaft, Dusseldorf, Germany

[21] Appl. No.: 50,546

[22] Filed: Apr. 20, 1993

Related U.S. Application Data

[63] Continuation-in-part of Ser. No. 910,893, Jul. 10, 1992, abandoned.

[30] Foreign Application Priority Data

Jul. 10, 1991 [DE] Germany ............................ 4123208

[51] Int. Cl.⁶ .............................................. F04B 41/06
[52] U.S. Cl. .................................... 417/243; 417/245; 417/364; 417/380
[58] Field of Search ................... 60/612; 417/243, 244, 417/245, 364, 380, 381, 382

[56] References Cited

U.S. PATENT DOCUMENTS 2,849,173 8/1958 Surdy ............................... 417/380 X
3,204,859 9/1965 Crooks .............................. 417/380 X
4,563,132 1/1986 Grimmer ......................... 417/380 X

FOREIGN PATENT DOCUMENTS

0248640 12/1987 European Pat. Off. .
2912190 10/1980 Germany .
3134844 7/1982 Germany .

Primary Examiner—Richard E. Gluck
Attorney, Agent, or Firm—Cohen, Pontani, Lieberman, Pavane

[57] ABSTRACT

A compressor arrangement for producing compressed air includes a compressor connected through a line to devices using the compressed gas and a supercharger driven by the exhaust of a heat engine. In order to improve the overall efficiency of the arrangement, the compressor is driven by the drive side of the heat engine and the supercharger is arranged in one of an intake line and a pressure line of the compressor. The pressure line forms the connection between the compressor and a pressure reservoir which is connected through another line to the devices using the compressed gas.

2 Claims, 11 Drawing Sheets

COMPRESSOR ARRANGEMENT

This is a continuation-in-part of U.S. application Ser. No. 07/910,893, filed Jul. 10, 1992 now abandoned.

BACKGROUND OF THE INVENTION

1. Field of the Invention

The present invention relates to a compressor arrangement of any type as it is usually used for the compression of a gaseous medium, particularly air. More specifically, the present invention relates to a compressor arrangement for the compression of a gaseous medium by means of a compressor which is driven by the working side of a heat engine and connected through a line to consuming devices. The driving side of at least one exhaust-driven supercharger is connected to the exhaust side of the heat engine and is connected through a line to the compressor.

2. Description of the Related Art

Mobile units for supplying compressed gas are required for the operation of movable devices which use compressed air and of implements as they are used, for example, in construction.

In view of the fact that natural resources must be used today more responsibly, it is necessary that especially commercial users of large amounts of energy save a portion of the energy by improved efficiencies of the used machines and devices. In the field of compressor technology, many attempts have been made to utilize exhaust heat, either within the process or outside of the process, in order to improve the energy balance and, thus, increase the overall efficiency.

DE-OS 29 12 190 discloses an arrangement for the production of compressed air of the above-described type in which the exhaust side of a multiple lifting cylinder internal combustion engine is connected to the driving side of an exhaust-driven supercharger. Air which has been taken in by the fresh air compressor of the exhaust-driven supercharger and which has been compressed is supplied through an intermediate cooler to the intake side of the internal combustion engine. Following the intermediate cooler, a line branches from the charging line leading to the internal combustion engine which is connected to the intake side of an air compressor, for example, a reciprocating compressor. The pressure line of the air compressor is connected to auxiliary units which in motor vehicles are operated by means of compressed air, such as, vehicle brakes, pneumatic suspension, door openers, etc. As a result of the proposed arrangement, an additional air filter for the air compressor is unnecessary and the thermal load acting on the components of the air compressor is lowered because of the reduction of the final compression temperature.

A method for operating a compressor with an internal combustion engine for the specific production of high-temperature high-pressure gas is known from EP 0 248 640. In this method, the exhaust heat of the internal combustion engine is utilized in an advantageous manner for increasing the temperature of the compressed gas. However, although this method improves the overall efficiency, this manner of operation is limited to the described specific field of application and is useless for compressed gas which is usually cooled.

In addition, DE-OS 31 34 844 discloses a multiple-stage compressor with coolers which are arranged between the individual stages of the compressor and which are integral components of a heat pump. In this case, compression heat produced by the process is converted into externally usable heat. The heat made available in this manner is not intended for internal use. This does improve the energy balance of the compressor arrangement, however, external processes are necessary for utilizing the recovered energy. Accordingly, this known manner of improving the efficiency cannot be used in independent movable compressors of the above-described type.

A structurally very simple solution is disclosed in U.S. Pat. No. 2,849,173. A heat engine, preferably a multiple-cylinder diesel engine, is connected through a coupling to a reciprocating compressor B. A second compressor A is arranged in the exhaust gas line of the engine. The second compressor A has on the drive side thereof a gas turbine. The compressor side is a multiple-stage axial flow compressor whose intake pipe is connected to a cleaning filter. The pressure pipe of the axial flow compressor is connected through a line to the intake side of the reciprocating compressor B. An intermediate cooler is arranged in this connecting line. The compressor stage ranged upstream in this arrangement is an expensive solution because of the presence of the multiple-stage axial flow compressor which, in addition, requires a large mount of space and, for this reason, is not particularly suitable for a mobile unit. Another disadvantage is the arrangement of the additional compressor stage A in front of the main compressor B because a large flow volume must be compressed from a very low initial pressure to a medium pressure. Because of this large flow volume, the compressor part is also large.

Another solution is proposed in U.S. Pat. No. 3,204,859. Also in this proposal, a precompressing compressor stage in the form of an exhaust gas supercharger is arranged in the exhaust gas line of a heat engine. The working side of the heat engine is connected through a shaft to the actual compressor unit. The airflow produced by the precompressing compressor is divided for charging the diesel engine, on the one hand, and to increase the quantity of the compressor, on the other hand. The supply of the precompressed gas takes place an intermediate portion of the compressor. This arrangement has the disadvantage that only a portion of the precompressed air flow is available for the secondary compression. In addition, the supply of air in the intermediate portion poses problems with respect to sealing and design of the machine because the compressor must be designed in the intake area for a small airflow and for a greater airflow for the area extending from the location where the additional supply takes place to the discharge.

An arrangement which includes two exhaust gas superchargers arranged in the intake line of the compressor is known from U.S. Pat. No. 4,563,132. The multiple-cylinder heat engine, for example, a V8 engine is divided into a motor portion and a compressor portion. The two exhaust gas superchargers are located on the drive side in series in the exhaust pipe of the motor, while the compressor sides of the two superchargers are connected parallel. As is the case in the proposal discussed above, the precompressed airflow is divided to the motor and the compressor. The proposed division of a heat engine into a motor portion and a compressor portion has the disadvantage that the two units operate at the same rate of rotation. This makes it impossible to vary the pressure and the quantity delivered. As a rule, such a combination machine is designed for motor operation, so that the compressor side does not have the optimum design.

SUMMARY OF THE INVENTION

Therefore, it is the object of the present invention to improve the overall efficiency of mobile compressor arrangements and to provide a mobile compressor arrangement of compact construction. In this regard, the overall efficiency is considered to be the ratio of the required drive energy to the quantity of compressed gas.

In accordance with the present invention, various types of arrangements of at least one or more exhaust-driven superchargers are provided, wherein, in the simplest case, the energy contained in the exhaust gas of the heat engine is utilized partially in at least one exhaust-driven supercharger for recompressing the compressed gas.

The compressor referred to above is essentially a compressor of any type which is suitable for the compression of a gas. Among such compressors are all compressors with adjustable compression space, such as, reciprocating compressors and screw-type compressors, and also all compressors which operate in accordance with a different system of compression, such as, superchargers. The heat engines referred to above are lifting piston engines, such as diesel engines and gasoline engines, as well as rotary piston engines and gas turbines of any type. The gas to be compressed is particularly air, however, the gas may also be any other gaseous medium which is suitable for compression. Suitable as intermediate coolers are heat exchangers of any type which are capable of cooling a gas, particularly air. Used as cooling medium may be ambient air as well as any other medium suitable for cooling in an open system as well as in a closed system. Suitable as exhaust-driven superchargers are particularly those having a radial wheel on the compressor side and turbine side, however, all other exhaust-driven superchargers are suitable, for example, those having an axial turbine wheel. Such exhaust-driven superchargers can be of compact construction, so that they require little space.

Starting from a known compressor which receives the gas to be compressed through a filter and an intake line and which feeds a pressure reservoir through a pressure line and which is operated by the working side of a heat engine, at least one exhaust-driven supercharger is provided. This exhaust-driven supercharger is arranged following the compressor for carrying out recompression. The supercharger is operated by the exhaust gas of the heat engine. It is particularly advantageous if the gas to be compressed is precompressed as well as recompressed because the overall efficiency is further improved due to the small compression ratio of each individual compression stage. The overall efficiency is further improved by arranging a heat exchanger as intermediate cooler between the individual compression stages be, cause the lowering of the temperature of the gas to be compressed lowers the energy required for the compressor arrangement.

For an improved division of the required flow volumes, an advantageous feature of the present invention provides that the two exhaust-driven superchargers are arranged in series or parallel in the intake line or the pressure line. In the case of a parallel division of the exhaust gas flow to two superchargers, it may be advantageous to arrange a control valve in each of the branching-off areas. Even an arrangement of three or more superchargers may still be advantageous for improving the overall efficiency of the composer arrangement, even though this makes the arrangement more complicated and expensive.

In addition, it is also possible to drive not only one but two or more mechanical compressors with one heat engine and to arrange one or more superchargers in front of, behind and/or between the compressors.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DESCRIPTION OF THE PREFERRED EMBODIMENTS

The schematic diagrams shown in the figures of the drawing merely include some principal structural groups of a compressor arrangement and the components necessary with respect to the present invention. All other structural components and groups required for operating a compressor are independent of the invention and may be inserted as necessary, without influencing the gist of the invention.

Figure 1:
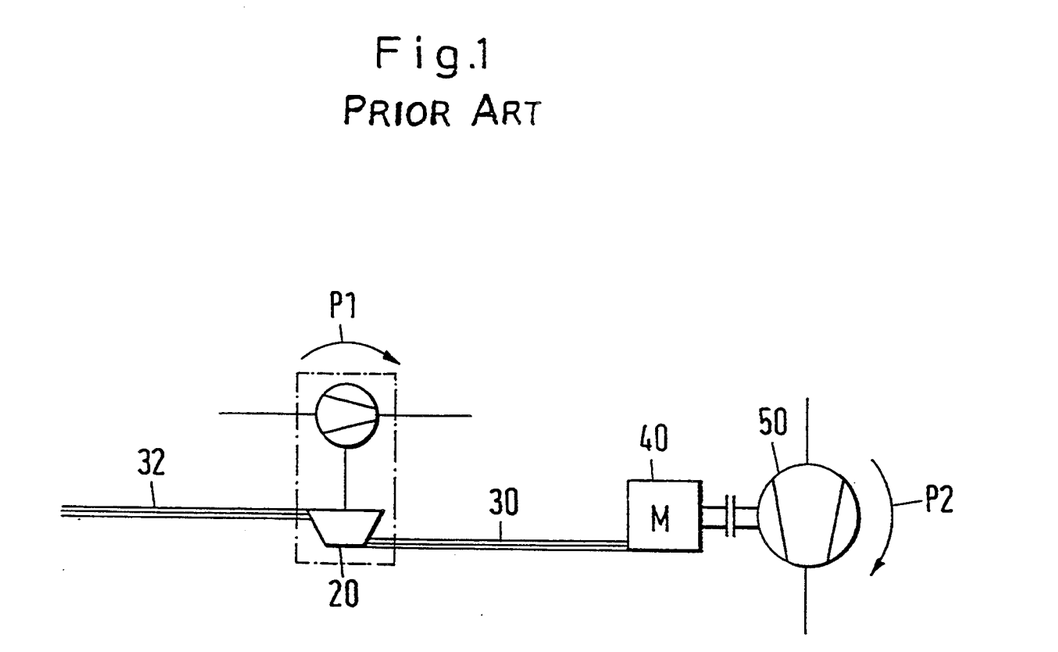
FIG. 1 is a diagram illustrating a conventional compressor arrangement.

FIG. 1 of the drawing shows a known heat engine 40 with a compressor 50 being connected to the working side of the engine 40. This compressor 50 produces a pressure difference P2 between its input and its output. The exhaust side of the heat engine 40 is connected through an exhaust line 30 to an exhaust-driven supercharger 20. The expanded exhaust gas of the heat engine 40 is removed through another exhaust line 32. The compressor part of the exhaust-driven supercharger 20 produces a pressure difference P1. This ensures that the energy on the working side of the heat engine 40 is converted by means of the compressor 50 and the exhaust energy of the heat engine 40 is converted by means of the exhaust-driven supercharger 20 in order to arrive at the desired pressure difference or compression ratio. Accordingly, by connecting the compressor stages in series, the total pressure difference of the compressor arrangement is the sum of all pressure differences, in this case P1 plus P2.

For producing a predetermined pressure difference, a given compressor arrangement requires a predeterminable quantity of energy which can be removed as a constant quantity from the given heat engine 40. When the same quantity of energy is converted in the heat engine 40, the overall efficiency of the compressor arrangement is now greater because of the increased compression ratios, and the exhaust heat is utilized internally within the process.

Figure 2:
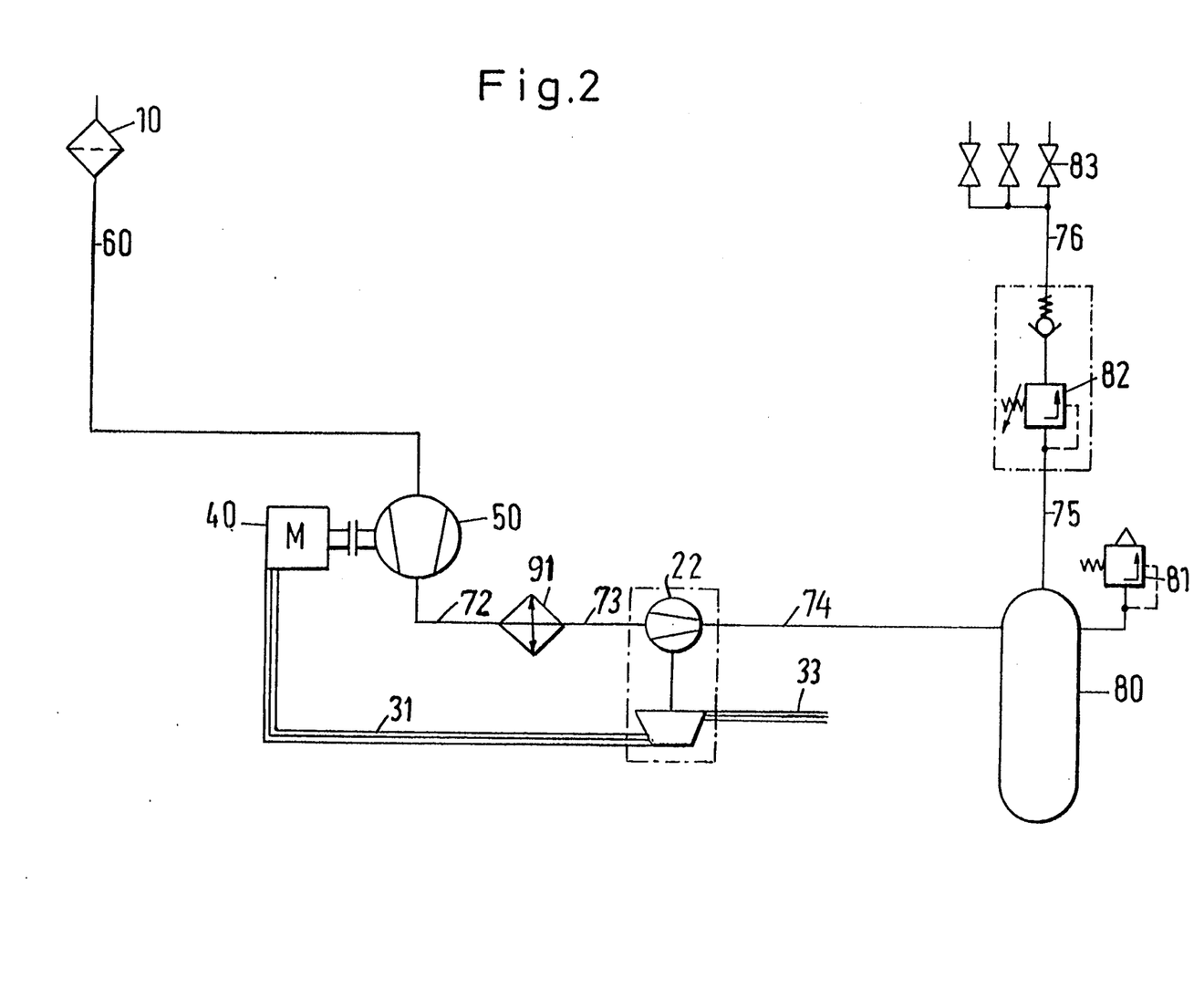
FIG. 2 is a diagram of an arrangement according to the present invention with an exhaust-driven supercharger arranged behind the compressor.

The diagram of FIG. 2 shows a compressor arrangement in which the gas to be compressed is cleaned by a filter 10 and is taken in by the compressor 50 through intake line 60. The driver of the compressor 50 is the heat engine 40. The exhaust gas of the heat engine 40 is conducted through the exhaust line 31 to the drive side of the exhaust-driven supercharger 22 and is subsequently removed through the exhaust line 33. The compressed gas from the compressor 50 reaches the pressure reservoir 80 the pressure line 72, 73 to the compressor side of the supercharger 22 and then through the pressure line 74. The pressure reservoir 80 is monitored by a safety valve 81. The compressed gas is conducted from the pressure reservoir 80 through the pressure line 75 via the pressure-maintaining check valve 82 and the pressure line 76 to the output valves 83.

Depending on the type of arrangement, an intermediate cooler 91 may be arranged in the pressure line 72, 73 between the compressor 50 and the supercharger 22. The advantage of this arrangement as compared to the prior art is to be seen in the fact that recompression is required only for a small air volume because the main compression has already taken place in the compressor 50. Accordingly, the supercharger 22 may be of compact construction.

Figure 3:
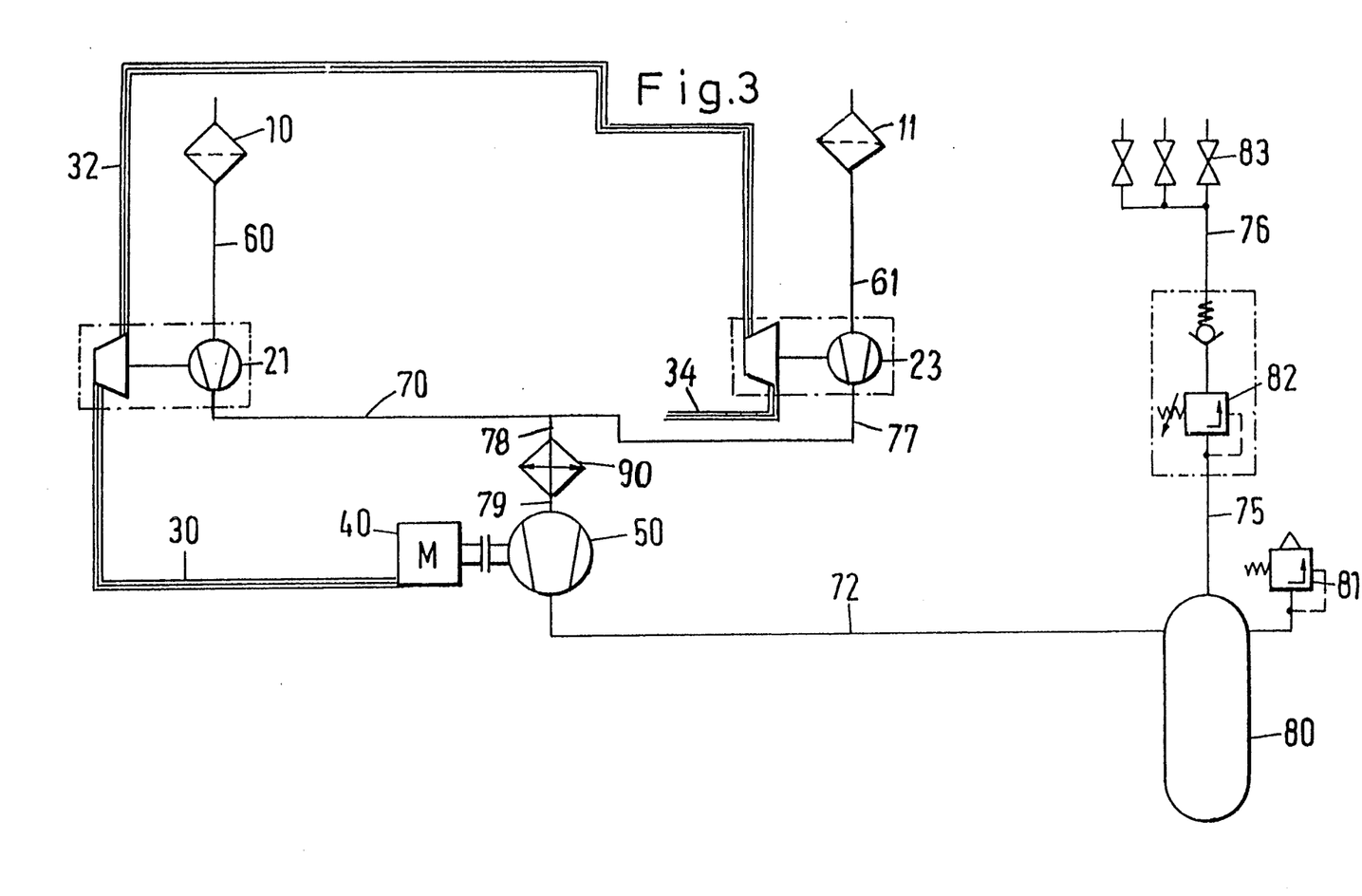
FIG. 3 is a diagram of a compressor arrangement with two exhaust-driven superchargers arranged parallel in front of the compressor.

Another embodiment of the present invention is illustrated in FIG. 3. In the arrangement of FIG. 3, two exhaust-driven superchargers 21, 23 are arranged on the drive side connected in series and parallel in the intake line 60, 61. As shown in FIG. 3, the gas to be compressed is separately cleaned in filters 10, 11 and is supplied through the intake line 60, 61 on the compressor side to the two exhaust-driven superchargers 21, 23. The respectively precompressed quantity of gas is then supplied to the compressor 50 through pressure lines 70, 77, 78, 79 arranged at the intake of the compressor 50. The compressor 50 is driven, in turn, by a heat engine 40. The exhaust gas of the heat engine 40 is initially supplied to the drive side of the first exhaust-driven supercharger 21 and subsequently, after partial expansion, to the drive side of the second exhaust-driven supercharger 23. In this arrangement, the sequence of the drive sides of the two superchargers 21, 23 arranged in series is insignificant. Depending on the type of arrangement, an intermediate cooler 90 may be arranged in the intake line 78, 79 or the compressor 50.

Figure 4:
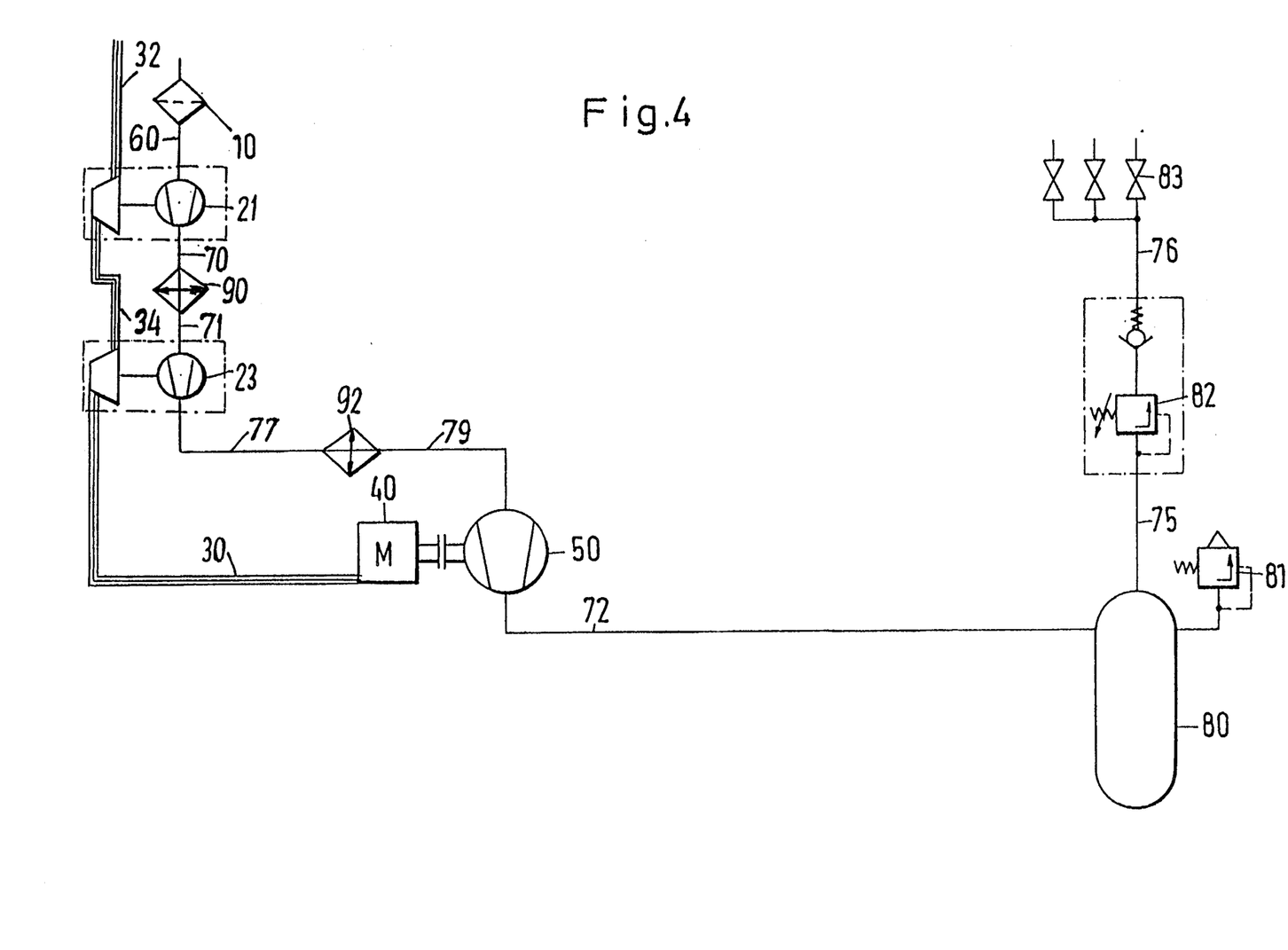
FIG. 4 is a diagram of a compressor arrangement with two exhaust-driven superchargers arranged in series in front of the compressor.

FIG. 4 shows another arrangement with two exhaust-driven superchargers 21, 23 arranged in the intake area. Contrary to FIG. 3, in this arrangement the compressor sides of the two superchargers 21, 23 are connected in series. The drive sides are also connected in series. In this arrangement, the exhaust gas of the heat engine 40 is initially supplied to the drive side of the supercharger 23 immediately in front of the compressor 50 and subsequently, after partial expansion, to the drive side of the supercharger 21 which is arranged following the cleaning filter 10. It is apparent that the exhaust gas flow can also be conducted in reverse sequence initially to the drive side of the supercharger 21 following the cleaning filter and then to the drive side of the supercharger 23 arranged in front of the compressor 50. Depending on the type of arrangement, an intermediate cooler 90, 92 each may be provided between the compressor 50, on the one hand, and the two superchargers 21, 23, on the other hand.

Figures 5, 5A:
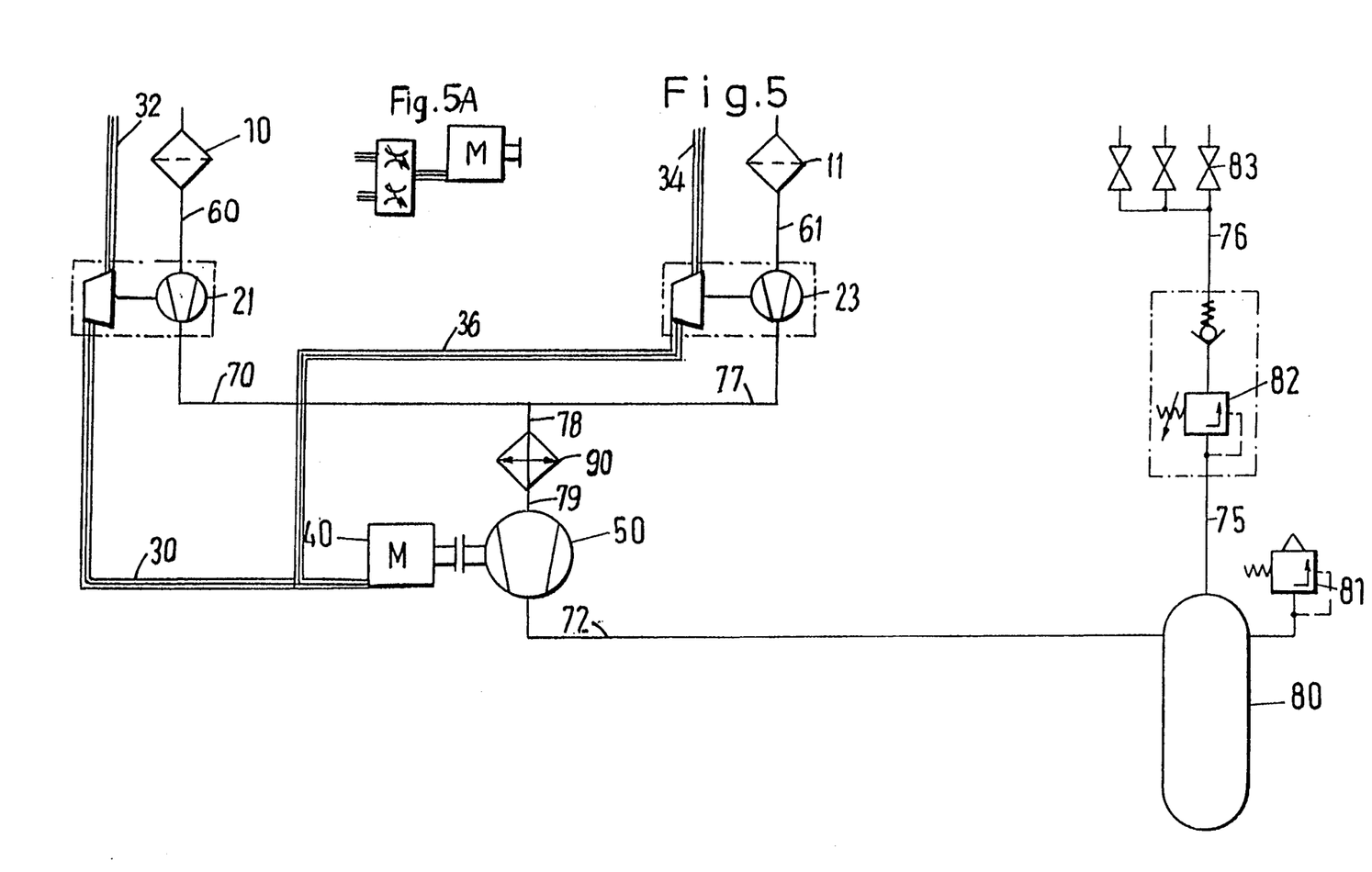
FIG. 5 is a diagram of the compressor arrangement of FIG. 3, however a divided exhaust gas flow.

Similar to FIG. 3, FIG. 5 shows two exhaust-driven superchargers 21, 23 which are connected in parallel and arranged in the intake area of the compressor 50. However, contrary to FIG. 3, the exhaust gas flow is divided, so that the drive sides of the two superchargers 21, 23 are parallel. As an alternative, FIG. 5A shows the arrangement of a valve control in the branching-off point of the exhaust gas flow. This control may be required if the output data of the two superchargers 21, 23 are different.

Figures 6, 6A:
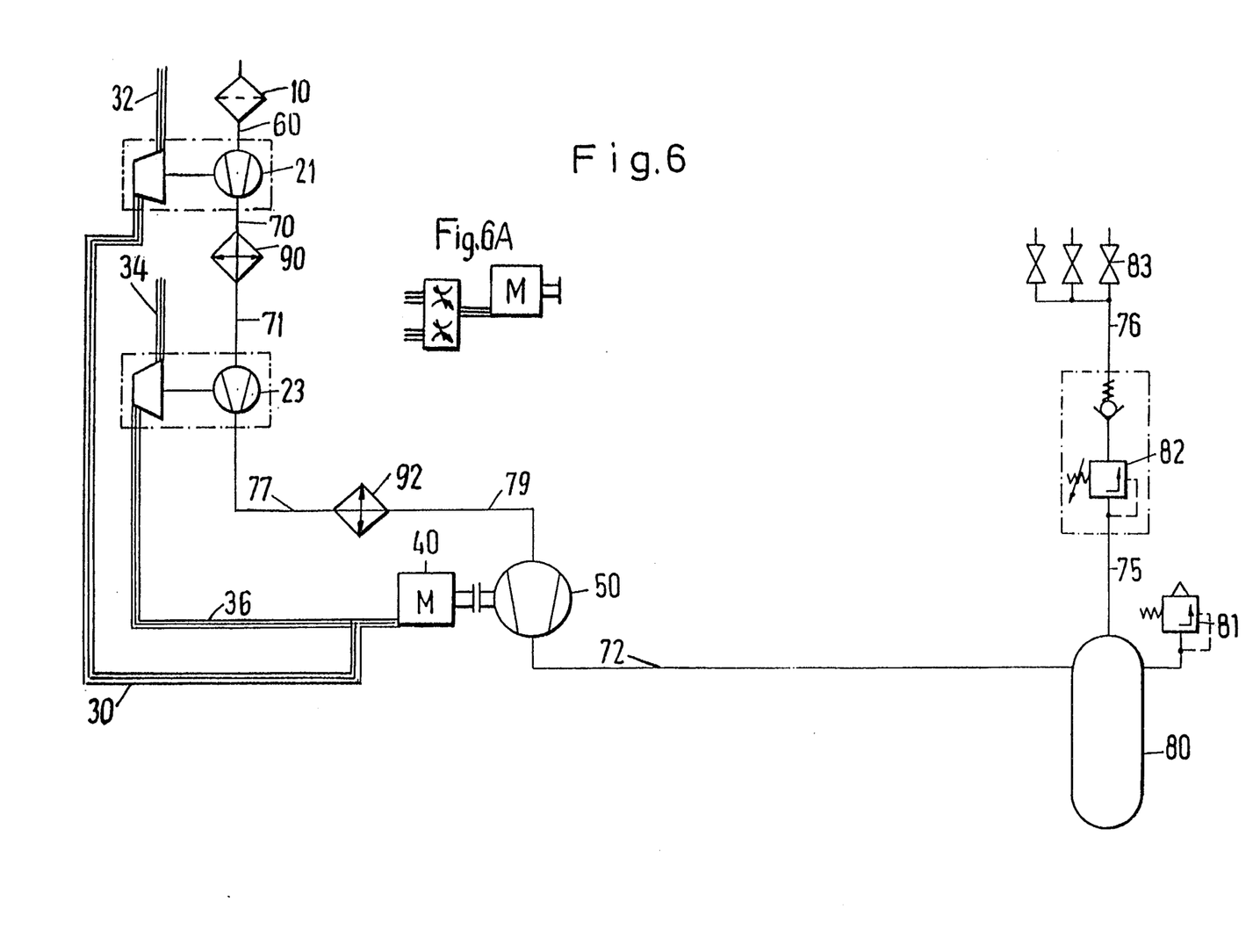
FIGS. 6, 6A are diagrams of the compressor arrangement of FIG. 4, however, with a divided exhaust gas flow.

FIG. 6 shows the compressor arrangement according to the present invention in which the compressor sides of the two superchargers 21, 23 are connected in series. As an alternative, FIG. 6A shows the arrangement of a valve control in the branching-off point of the exhaust gas flow. This may be an advantage if it is taken into consideration that the work performed by the two superchargers 21, 23 is different.

Figures 7, 7A:
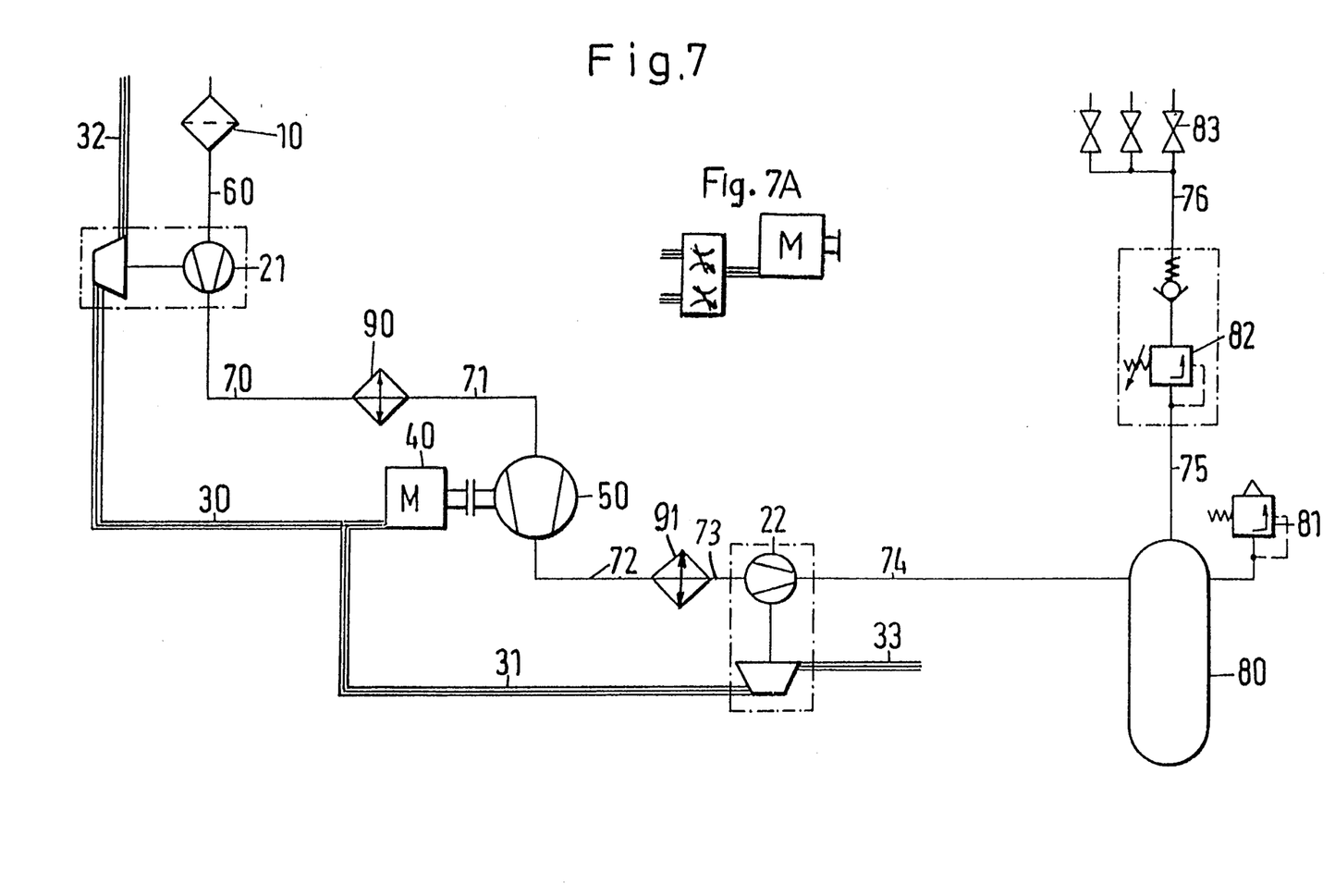
FIGS. 7, 7A are diagrams showing an arrangement with a supercharger each arranged in front of and following the compressor.

Another embodiment of the compressor arrangement according to the present invention is shown in FIG. 7. In this arrangement, an exhaust-driven supercharger 21 is arranged in front of the compressor 50 and an exhaust-driven supercharger 22 is arranged following the compressor 50. FIG. 7A additionally shows a control of the exhaust gas flow in the branching-off point. As already mentioned above in connection with the other embodiments, depending on the type of arrangement, an intermediate cooler 90, 91 each can be arranged between the compressor 50 and the two superchargers 21, 22. Each intermediate cooler 90, 91 may optionally be provided with a condensate discharge.

Figure 8:
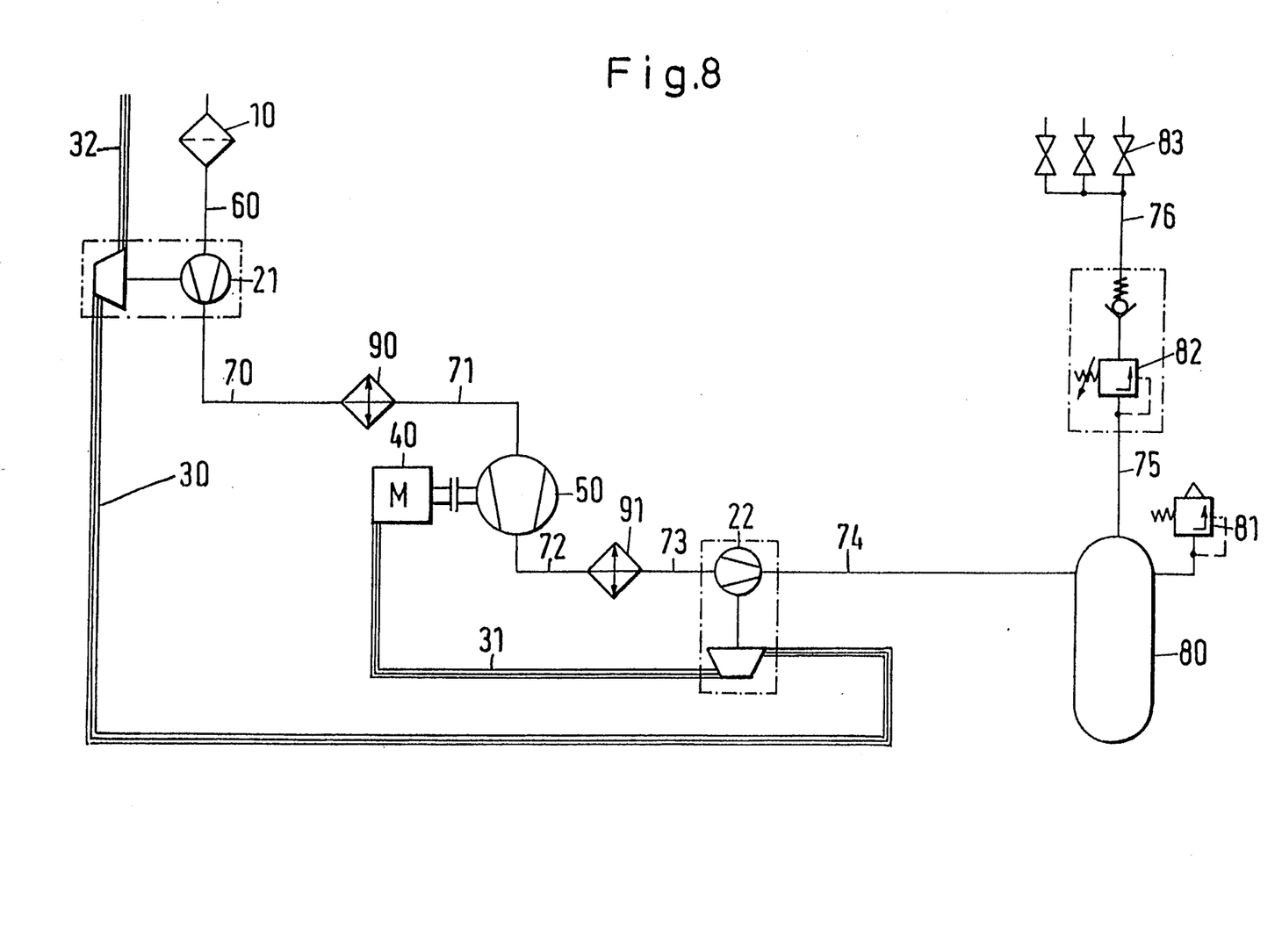
FIG. 8 is a diagram of the compressor arrangement of FIG. 7, however, and undivided exhaust gas flow.

FIG. 8 of the drawing shows a compressor arrangement according to the present invention similar to the one shown in FIG. 7. In this arrangement, the drive sides of the exhaust-driven superchargers 21, 22 are connected in series. In principle, it is conceivable that the exhaust gas is first supplied to the drive side of the supercharger 21 arranged in front of the compressor 50 and then to the drive side of the supercharger 22 arranged following the compressor 50. At any rate, the sequence shown in FIG. 8 is thermodynamically more advantageous.

Figures 9, 9A:
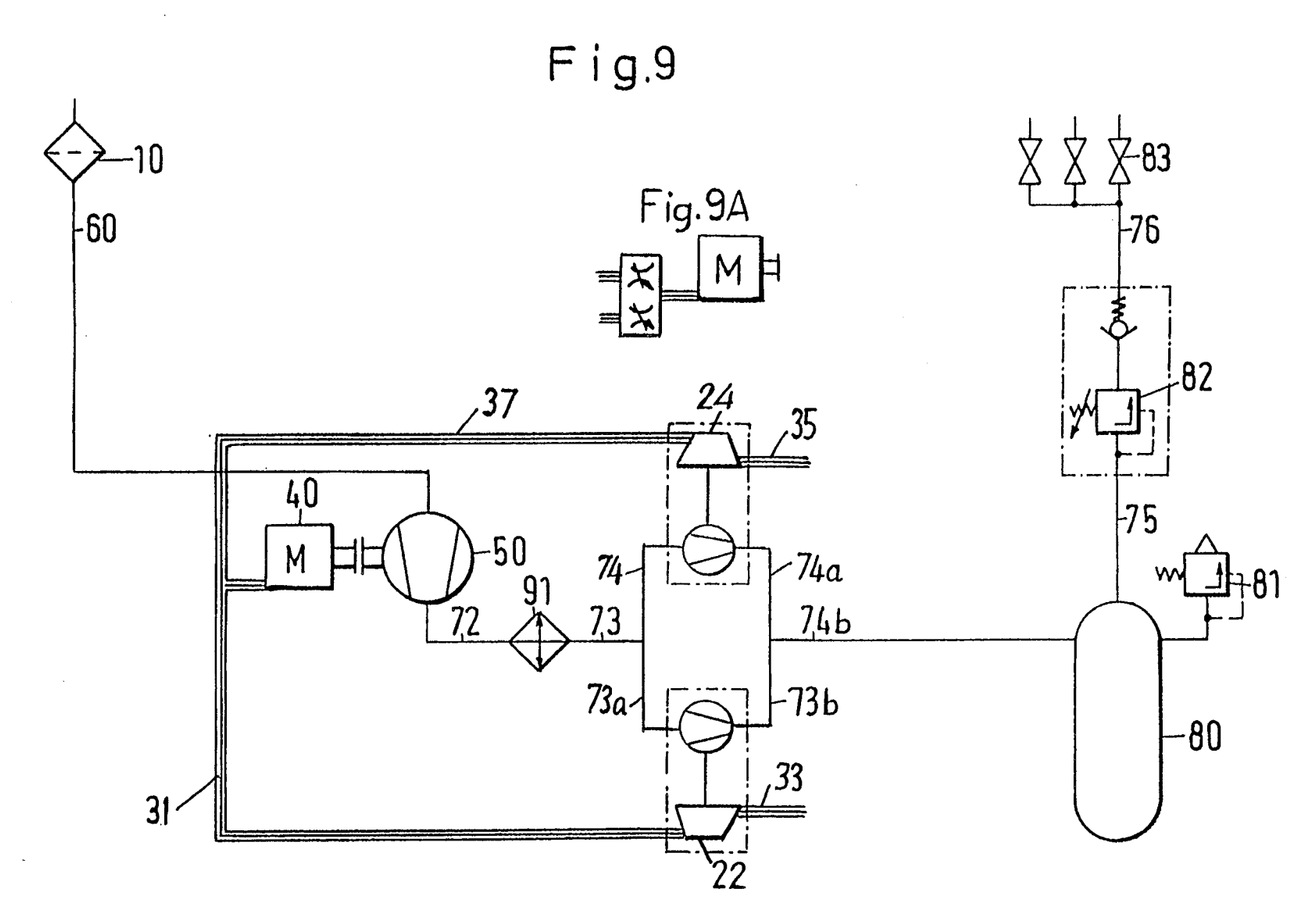
FIGS. 9, 9A are diagrams of a compressor arrangement with two exhaust-driven superchargers arranged parallel following the compressor.
Figure 10:
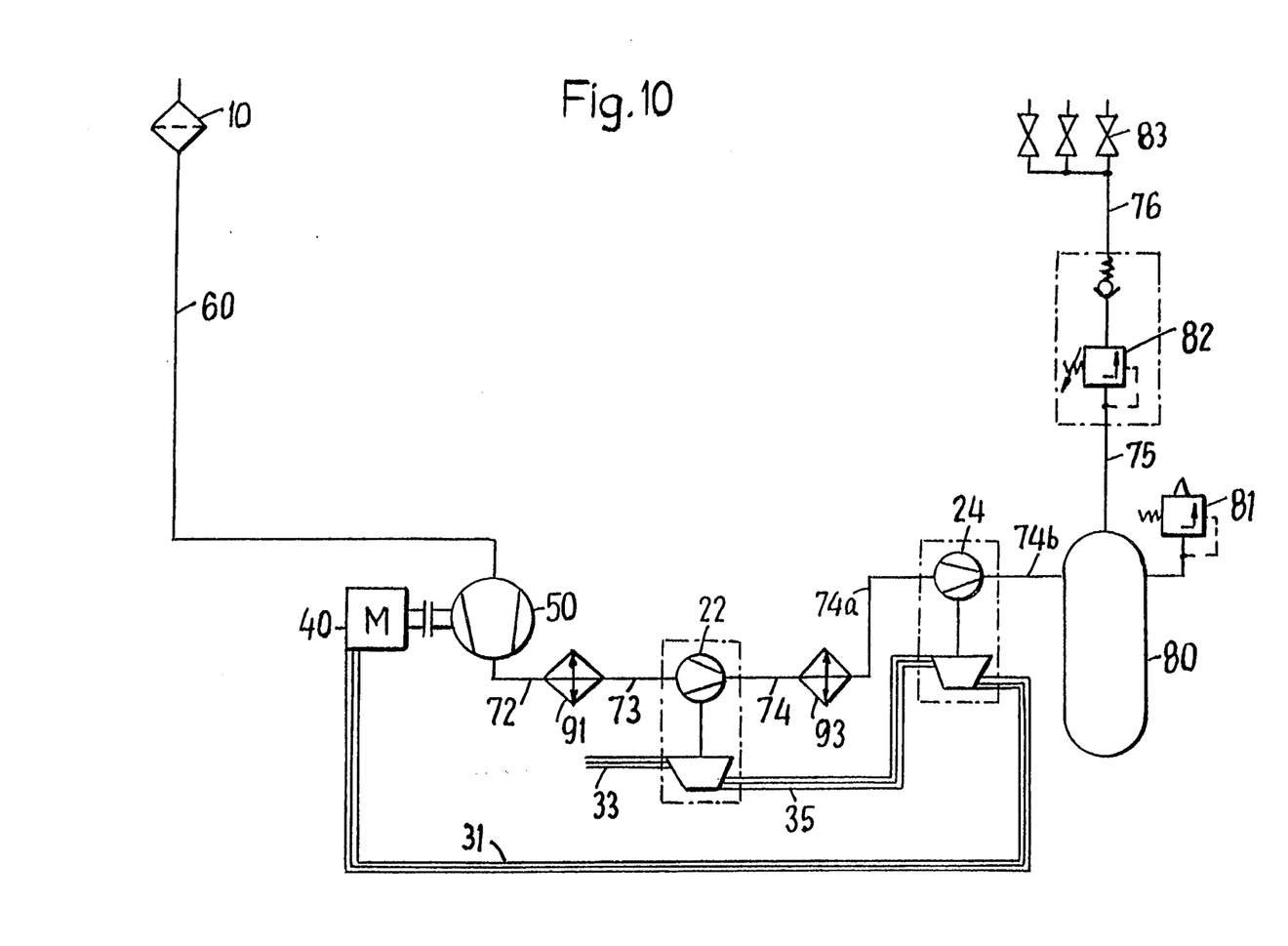
FIG. 10 is a diagram of a compressor arrangement with two exhaust-driven superchargers arranged in series following the compressor.

FIGS. 9 and 10 of the drawing show a reverse arrangement of the superchargers as compared to FIGS. 3 to 6. In FIGS. 9 and 10, the two exhaust-driven superchargers 22, 24 are arranged following the compressor 50. With respect to the arrangement in series and in parallel, the same variations are possible as those shown in FIGS. 3 to 6. In principle, the arrangement of FIG. 9 corresponds to that of FIG. 5 and the arrangement of FIG. 10 corresponds to that of FIG. 4. Not illustrated are the arrangements corresponding to the arrangement of FIG. 3, i.e., drive sides in series and compressor sides in parallel, and the arrangement of FIG. 6, i.e., drive sides in parallel and compressor sides in series.

Figures 11, 11A:
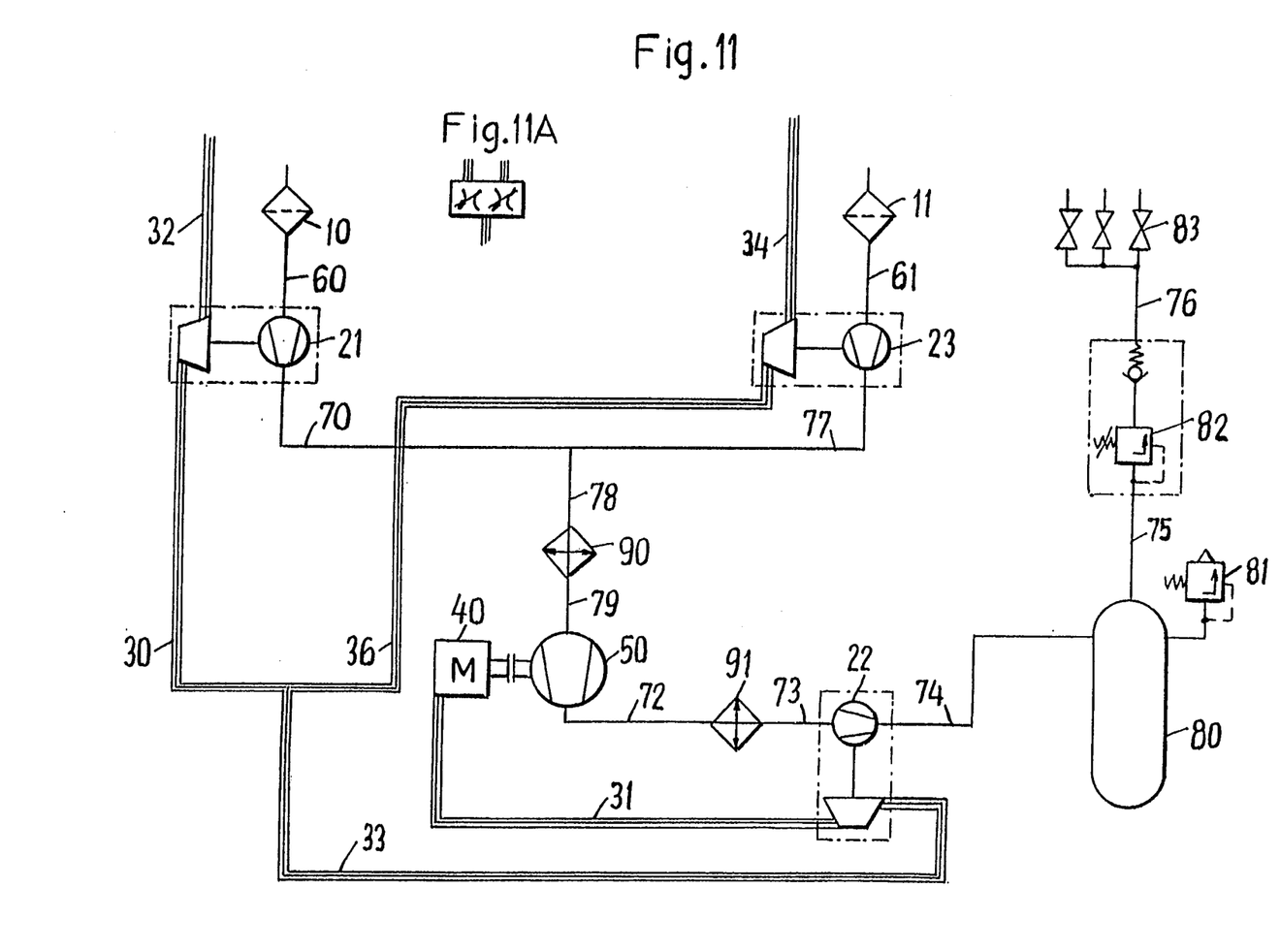
FIGS. 11, 11A are diagrams showing a compressor arrangement with three exhaust-driven superchargers.

FIG. 11 of the drawing shows together with FIG. 11A a further development of the invention in which three exhaust-driven superchargers 21, 22, 23 are provided. In this arrangement, two superchargers 21, 23 are arranged in parallel and in front of the compressor 50 and one supercharger 22 is arranged following the compressor 50. In order to be complete, it is pointed out that, similar to the examples described above, corresponding variations are possible, depending on whether a connection in series or in parallel is provided and how the exhaust gas flow is conducted and divided. Further combinations of three and more superchargers are possible. However, these combinations are not illustrated because they are not required for a better understanding of the invention.

It should be understood that the preferred embodiments and examples described are for illustrative purposes only and are not to be construed as limiting the scope of the present invention which is properly delineated only in the appended claims.

I claim:

1. A compressor arrangement for compressing a gaseous medium, the arrangement comprising a compressor, a heat engine having a work side and an exhaust side, the compressor being driven by the work side of the heat engine, a line connecting the compressor to means for using the compressed medium, the compressor having an intake line, two exhaust-driven superchargers arranged in the intake line of the compressor, the superchargers having drive sides, the drive sides of the superchargers being arranged in series downstream of the exhaust side of the heat engine, wherein the heat engine and the compressor are separate machines, the heat engine and the compressor each having a drive shaft, a coupling connecting the drive shaft of the heat engine to the drive shaft of the compressor, each supercharger having a compressor side, a line for supplying a total flow volume of the compressor sides of both superchargers to the compressor, and an intermediate cooler arranged in the total flow volume line between the superchargers and the compressor.

2. The arrangement according to claim 1, wherein the compressor sides of both superchargers are arranged in parallel.

* * * * *